US012800914B2

(12) United States Patent
Nemeth et al.

(10) Patent No.: US 12,800,914 B2
(45) Date of Patent: Nov. 17, 2026

(54) CAMERA ARM WITH CLEANING DEVICE FOR CAMERA LENS WITH AIR CHANNEL SYSTEM

(71) Applicant: Motherson Innovations Company Ltd., London (GB)

(72) Inventors: Norbert Nemeth, Stuttgart (DE); Robert Radnai, Mosonmagyaróvár (HU); Otto Klementis, Mosonmagyaróvár (HU)

(73) Assignee: Motherson Innovations Company Limited, London (GB)

( * ) Notice: Subject to any disclaimer, the term of this patent is extended or adjusted under 35 U.S.C. 154(b) by 217 days.

(21) Appl. No.: 18/782,776

(22) Filed: Jul. 24, 2024

(65) Prior Publication Data

US 2025/0060581 A1 Feb. 20, 2025

(30) Foreign Application Priority Data

Aug. 16, 2023 (DE) ..................... 10 2023 121 933.2

(51) Int. Cl.
*G02B 1/00* (2006.01)
*B60S 1/54* (2006.01)
(Continued)

(52) U.S. Cl.
CPC ............ *G02B 27/0006* (2013.01); *B60S 1/54* (2013.01); *B60S 1/56* (2013.01)

(58) Field of Classification Search
CPC .......... G02B 27/0006; B60S 1/54; B60S 1/56; B08B 5/02; B08B 13/00; H04N 23/55
See application file for complete search history.

(56) References Cited

U.S. PATENT DOCUMENTS 11,634,087 B1 4/2023 MacGregor et al.
2019/0210410 A1* 7/2019 Tikka .................. B60C 11/0306
2020/0223401 A1* 7/2020 Little ........................ B60S 1/56

FOREIGN PATENT DOCUMENTS

DE 3884826 T2 2/1994
DE 102020200695 7/2021

OTHER PUBLICATIONS

German Patent and Trademark Office, Appl. 10 2023 121 933.2, Office Action, Mar. 22, 2024.

(Continued)

*Primary Examiner* — Euncha P Cherry
(74) *Attorney, Agent, or Firm* — Jones Day

(57) ABSTRACT

The disclosure relates to a camera arm adapted for an exterior camera arm system to be mounted on an exterior side of a vehicle comprising a recess provided for receiving a camera with an outer camera lens being part of or protruding from a recess surrounding outer surface of the camera arm, wherein the camera arm comprises a passive camera cleaning component established by an inlet opening facing towards a driving direction of the vehicle when being mounted to the vehicle, an outlet opening adapted to face the camera lens of the camera when received in the recess and an air guiding channel connecting inlet opening with outlet opening to guide an air flow caused by an airstream when driving the vehicle, the outlet opening being adapted to let out the air flow across the recess surrounding outer surface in a flow direction with a main directional component being directed substantially perpendicular to the driving direction of the vehicle, where the camera arm is suitably shaped to provide a suction effect to the air flow in the opposite direction of the driving direction when driving the vehicle, where a cleaning air flow resulting from an interference of the air flow let out of the outlet opening and the provided (Continued)

suction effect is directed towards the camera lens of the camera being received in the recess when the vehicle is driven.

23 Claims, 12 Drawing Sheets

(51) Int. Cl.
*B60S 1/56* (2006.01)
*G02B 27/00* (2006.01)

(56) References Cited

OTHER PUBLICATIONS

German Patent and Trademark Office, Appl. 10 2023 121 933.2, Search Report, Mar. 22, 2024.

* cited by examiner (a)

(b)

CAMERA ARM WITH CLEANING DEVICE FOR CAMERA LENS WITH AIR CHANNEL SYSTEM

CROSS-REFERENCE TO RELATED APPLICATION

This application claims priority to German Patent Application No. 10 2023 121 933.2, filed on Aug. 16, 2023, the entirety of which is incorporated herein by reference.

FIELD

The disclosure refers to a camera arm adapted for an exterior camera arm system to be mounted on an exterior side of a vehicle. In particular, the camera arm comprises a passive camera cleaning component established by an inlet opening facing towards a driving direction of the vehicle, an outlet opening adapted to face a camera lens of a camera of the camera arm and an air guiding channel connecting inlet opening with outlet opening providing a cleaning air flow resulting from an interference of the air flow let out of the outlet opening and a suction effect towards the camera lens when the vehicle is driven. The disclosure further relates to a camera arm system comprising such camera arm and to a vehicle comprising such camera arm system.

BACKGROUND

Motor vehicles comprise cameras to observe the driving situation around the vehicle. These cameras are exposed to the environmental conditions around the vehicle and get dirty over time. Therefore, the cameras and must be cleaned from dirt and water regularly for reliable operation. Otherwise, the driving security might be endangered. Beside active cleaning components, also passive cleaning measures are used to clean those cameras. The latter require less component effort, since the passive components do not require moving parts or actuators and represent a cheaper solution.

Document DE 10 2019 004 778 discloses a camera system for a motor with a camera housing and a camera lens, where the camera housing has at least one air flow channel with an inlet opening for receiving airstream and an outlet opening for discharging the airstream in order to blow the camera lens and/or its field of view free of impurities. However, during driving there is a speed dependent continuous airstream around the vehicle. This driving causes the airflow exiting the outlet port and being deflected away from the camera lens being cleaned by the airstream passing the camera system on the outside. For this reason, the camera lens is not cleaned in a controlled and reliable way leading to remaining impurities of water drops on the camera lens lowering the driving security.

It is therefore desirable to provide a passive cleaning procedure enabling reliable cleaning of the camera lens even under driving conditions.

SUMMARY

An object of the present disclosure is to provide a passive cleaning procedure enabling reliable cleaning of the camera lens even under driving conditions.

This object may be solved by a camera arm adapted for an exterior camera arm system to be mounted on an exterior side of a vehicle comprising a recess provided for receiving a camera with an outer camera lens being part of or protruding from a recess surrounding outer surface of the camera arm, wherein the camera arm comprises a passive camera cleaning component established by an inlet opening facing towards a driving direction of the vehicle when being mounted to the vehicle, an outlet opening adapted to face the camera lens of the camera when received in the recess and an air guiding channel connecting inlet opening with outlet opening to guide an air flow caused by an airstream when driving the vehicle, the outlet opening being adapted to let out the air flow across the recess surrounding outer surface in a flow direction with a main directional component being directed substantially perpendicular to the driving direction of the vehicle, where the camera arm is suitably shaped to provide a suction effect to the air flow in the opposite direction of the driving direction when driving the vehicle, where a cleaning air flow resulting from an interference of the air flow let out of the outlet opening and the provided suction effect is directed towards the camera lens of the camera being received in the recess when the vehicle is driven.

The camera arm may have any suitable shape to carry the camera and to be attachable to a vehicle. The camera arm might by attached to the vehicle side. The camera arm might be substantially a hollow body with a substantially closed outer surface. The camera arm might be made of any suitable material. The material might be plastic comprising further components inside made of any other or the same material.

The term "recess" denotes a cavity in the camera arm with a hole to the outside, where a camera can be suitably placed inside enabling to record images from the environment of the camera arm or the vehicle. The recess is surrounded by the outer surface of the camera arm, where the outer surface near the recess is denoted as recess surrounding outer surface. The camera can be placed inside the recess in such a way that the outer camera lens closes the recess to the outside in contact with the recess surrounding outer surface establishing a contiguous surface in combination with the recess surrounding outer surface. In other embodiments the camera and therefore the camera lens may protrude from the recess surrounding outer surface.

The term "camera" denotes any unit, which is capable to optically recording a scenery comprising an optical lens as an entry aperture from electromagnetic radiation from the environment of the camera and an optical path inside the camera suitable to guide the received electromagnetic radiation to a suitable sensor, where the electromagnetic radiation is converted into an electronic signal or picture, where the properties of optical lens, optical path and sensor determine the resolution of the recorded scenery, which might be displayed on the monitoring unit to a driver of a vehicle. The electromagnetic radiation received by the camera unit and converted by the sensor might be radiation of the infrared, visible and/or ultraviolet spectrum of wavelengths.

The passive camera cleaning component denotes a component of the camera arm, where a certain air flow can be directed to a target, here the camera lens. The air flow is generated without any electrical components such as pump or fan just applying a channel through the camera arm, where the air flow flows from an inlet opening to an outlet opening. Inlet and outlet opening may have any suitable shape, where the outlet opening might act as a nozzle to direct the air flow to the target. The air flow is caused by the air resistance during the travel of the vehicle resulting in an airstream flowing around the vehicle during driving. Here, the airstream also penetrates the camera arm via the air guiding channel. The higher the driving speed, the higher the speed of the air flow. However, the speed of the airflow leaving the outlet opening further depends on shape and dimensions of the air guiding channel and the location of the passive camera cleaning component within the camera arm and its alignment with respect to the driving direction. The driving direction denotes the direction, into which the vehicle moves. If the inlet opening of the passive camera cleaning component has an inlet area essentially aligned perpendicular to the driving direction, the airstream enters with maximum speed into the passive camera cleaning component and generates an air flow through the air guiding channel with maximum speed. In case of the vehicle stops, there will be no air flow or only a neglectable air flow caused by the environmental wind through the air guiding channel. The outlet opening is shaped and positioned in such a way that the air flow leaves the passive camera cleaning component in a direction suitable to clean the camera lens. The passive camera cleaning component might be made of plastic and might comprise one or more bends between inlet and outlet openings.

The flow direction of the air flow having left the outlet opening is a vector composed of a component perpendicular to the driving direction of the vehicle and parallel to the driving direction in direction to the vehicle backside. Here, the main directional component is directed perpendicular to the driving direction of the vehicle. That means that the angle between the direction of the air flow at the outlet opening and the direction perpendicular to the driving direction (the direction pointing towards the vehicle side, where the camera arm is mounted to) is less than 45 degrees. However, the camera arm is a massive acrodynamic drag with a side opposite to the airstream caused by the vehicle speed resulting a suction effect on the air on this side opposite to the airstream. The suction effect acts on the air flow after the air flow having left the outlet opening pressing the air flow more in opposite driving direction (backwards direction). The resulting air flow direction is denoted as direction of the cleaning air flow, which is directed over the lens. This cleaning air flow results from the interference of the air flow with air flow direction at the outlet opening and the provided suction effect. In order to have the cleaning air flow passing the camera lens under driving conditions, the original direction of the air flow when leaving the outlet opening being not disturbed by the driving airstream is directed to a region of the recess surrounding outer surface located between the camera lens and the front of the camera arm directed towards the driving direction. The airstream across the camera arm and the resulting suction effect presses the cleaning air flow towards the camera lens.

The camera arm might be mounted on an exterior side of the vehicle, e.g. the left and/or right side of the vehicle acting as a rear-view viewing device. The term “vehicles” denotes any means of transport that provides the driver with at least a partial rear view of traffic by means of additional visual aids, here the camera monitoring system. Vehicles might be cars, trucks, motor bikes etc.

The camera arm according to embodiments of the present disclosure enables reliable cleaning of the camera lens even under driving conditions without requiring further electrical components. The reliable cleaning can be maintained by providing a suitable shaped air flow channel and therefore is always ready for use and does not require a maintenance interval. Furthermore, the camera arm according to embodiments of the present disclosure does not produce whistling noise during driving.

In an embodiment the air flow entering the air guiding channel via the inlet opening has a first air flow direction, where the air guiding channel comprises a curvature of 45 degree or more redirecting the air flow inside the air guiding channel from the first air flow direction to a second air flow direction with which the air flow exits the outlet opening. In other embodiments the air guiding channel comprises a curvature of 60 degree or more.

In another embodiment the air guiding channel comprises one or more lamellas arranged along the air flow inside the air guiding channel dividing the air flow into two or more sub-air flows. The number of applied lamellas may depend on the size of the air guiding channel perpendicular to the direction of the air flow. There might be two lamellas inside the housing of the air guiding channel. The housing also guides the air flow through the air guiding channel. The one or more lamellas may divide the inlet opening into separate sub-openings. The lamellas help to optimize the air flow. The size of the sub-openings in relation to each other adapt the air quantity to be let into the air guiding channel. The sub-openings may have inlet areas increasing from the sub-opening with the longest distance to a vehicle side of the camera arm to the sub-opening arranged in closest distance to the vehicle side of the camera arm.

In another embodiment a cross sectional area of the air guiding channel perpendicular to the air flow decreases from the inlet opening to the outlet opening. The decreasing cross section of the air guiding channel leads to an acceleration of the air flow of up 50% faster at the outlet opening compared to the air flow speed at the inlet opening.

In another embodiment the inlet opening has a substantially round, elliptical, semicircle, triangular, polygonal, diamond, rhomboid, cross, ring, arched, and/or rectangular shape, wherein preferably a horizontal width of the inlet opening is larger than its vertical width. A, preferably rectangular, shape with a large horizontal length and a smaller vertical length enables to provide a large opening while still minimizing the wind resistance of the camera arm. The term “horizontal” denotes a direction parallel to the ground on which the vehicle is located. The term “vertical” denotes a direction perpendicular to the ground on which the vehicle is located.

In another embodiment the outlet opening is covered by an air guiding element to further shape the air flow towards the camera lens. The air guiding element can be used for fine tuning the air flow outgoing direction and air flow speed. This allows to apply the same air guiding channel design to different car versions and to different arm version. The air guiding elements might be made of plastic.

In another embodiment the air guiding element is a grille element comprising one or more ribs extending towards the recess. There might be at least one of the one or more ribs tapering towards the recess. The ribs allow dosing of the air flow and special flow profiles can be implemented. The length of the rips in direction towards the recess depends on the shape of the recess surrounding outer surface of the camera arm. The term “grille” denotes a cover covering an opening in a body of the vehicle to allow air to enter or exit.

In another embodiment the air guiding element is an air tunnel suitable shaped to guide the air flow to the camera lens, where the air flow is lifted from the recess surrounding outer surface. The air tunnel compensates the indirect influence of the main airstream around the arm, even in case of the air flow is not directed in favor of the camera by changing its local air flow. The air tunnel might be applied in case of a camera lens protruding from the recess surrounding outer surface.

In another embodiment the air guiding element is reversibly attachable to the outlet opening. The attachment might be performed by clipping and/or screwing. The attachable air guiding element allows to use the same passive camera cleaning component for different camera arms, different vehicles, different driving speeds and different cameras with different shapes of the lenses, because the air flow direction can be finetuned via the attachable air guiding element. This reduces the production costs since only a small component has to be adapted to different use cases instead of requiring different passive camera cleaning components.

In another embodiment the outlet opening has a substantially round, elliptical, semicircle, triangular, polygonal, diamond, rhomboid, cross, ring, arched, and/or rectangular shape, where a horizontal width of the outlet opening is larger than a vertical width of the substantially round, elliptical, semicircle, triangular, polygonal, diamond, rhomboid, cross, ring, arched, and/or rectangular shape. Therefore, the air flow leaving the passive camera cleaning component covers a wide area of the recess surrounding outer surface in order to completely cover and thus clean the flat lens. The term "horizontal" denotes a direction parallel to the ground on which the vehicle is located. The term "vertical" denotes a direction perpendicular to the ground on which the vehicle is located.

In another embodiment an imaginary reference line extends in perpendicular direction from the horizontal width of the rectangular shape of the outlet opening to the center of the camera lens, where a geometrical center of the, preferably substantially round, elliptical, semicircle, triangular, polygonal, diamond, rhomboid, cross, ring, arched, and/or rectangular, shape of the outlet opening is shifted along the horizontal width of the, preferably substantially round, elliptical, semicircle, triangular, polygonal, diamond, rhomboid, cross, ring, arched, and/or rectangular, shape of the outlet opening in driving direction by a distance starting from the imaginary reference line to the geometrical center being equal or larger than ¼ of the horizontal width. A camera arm having the outlet opening located according to this specification provides an optimum cleaning air flow to the camera lens when driving at a vehicle speed of 80 km/h, which is a common speed of trucks.

In another embodiment a wing guide is arranged close to the recess surrounding outer surface and being suitably shaped to block at least partly the recess surrounding outer surface from direct contact with the airstream around at least a part of the camera arm caused by driving the vehicle, and/or wherein the wing guide is substantially in the form of a wall, preferably adapted to change the direction of the air stream and reduce the pressure onto the camera lens. Here the shape of the wing guide may be either matched and synchronized with the outlet opening of the passive camera cleaning component and also matched not to influence the field of view of the camera. The wing guide, in particular in form of a substantially wall-shaped embodiment, may act as a vacuum generator in direction of the airstream towards the recess of the camera arm based on its aerodynamic effect. The generated vacuum deflects the airstream with dust or rain drop from the camera lens. The acting low pressure is generated by the airstream flowing around. This effect is normally used for airplane lifting effect on its wings according to the Bernoulli's conservation of energy law. The higher speed of the airstream caused by the wing guide leads to a force lifting up dust or rain drops from the camera lens.

In another embodiment the wing guide is suitably shaped to provide an air cushion around the outlet opening and the camera lens lifting off the airstream from the recess surrounding outer surface. In case of an air cushion between camera arm and airstream around the camera arm, the camera lens is kept free of dust or rain drop transported with the surrounding airstream. The air cushion is mostly stable above the recess surrounding surface with flow speeds below 8 m/s, mostly below 4 m/s.

In another embodiment the wing guide has a first surface directing towards the recess and a second surface directing in an opposite direction, where the wing guide has a sawtooth shape with the second surface as a slowly rising surface and the first surface as a steeply sloping surface of the sawtooth shape. This shape provides a reliable air cushion behind the wing guide covering the camera lens. With increasing of the travel speed "v" the suction effect (drag coefficient) can change. Most vehicles travel more likely on long distance with certain travel limited speed. This speed can be considered in the simulations and geometry of the wing guide can be profiled based on this the surface has precondition on the travelling direction. It can be applied on any direction perpendicular to the travel direction-up/down/lateral shape is adapted to the vehicle shape and specific to a chosen travel speed. The wing guide has no effect as the vehicle is stopped.

In another embodiment the first surface protrudes from the recess surrounding surface with optionally a height that is at least of twice as large as the height of the camera lens with which the camera lens protrudes from the recess surrounding surface. However, the height of the first surface is adapted not to influence the field of camera view. The allowable absolute height the first surface also depends on the height of the camera lens with which the camera lens protrudes from the recess surrounding surface and on the size of the camera lens.

In another embodiment the first surface protrudes in vertical direction from the recess surrounding surface. However, the first surface is not allowed to influence the field of camera view and is matched and synchronized with the outlet opening of the passive camera cleaning component.

In another embodiment the wing guide partly surrounds the recess and/or the camera lens. The partly surrounding wing guide enables precisely shaping of the lifting up effect to remove dust or rain drops from the camera as well as preventing further dust or rain drops as part of the surrounding airstream reaching the camera lens during driving the vehicle.

In another embodiment a sealing is arranged between the camera and/or camera lens and the recess surrounding outer surface of the camera arm, the sealing covering a clearance gap between the camera and/or camera lens and the recess surrounding outer surface. Due to the tolerance chain the camera and the camera arm has always a gap between. The clearance gap is required between the camera/camera lens and a lower cover of the camera arm to avoid additional stresses in the housing. Additional stresses can negatively influence the scam behavior at the overall level of the camera arm system, in particular the stitching behavior. Water leaks out of the camera arm through the clearance gap between camera/camera lens and the recess surrounding outer surface as the part of the camera arm housing around the camera/camera lens and will cover the camera lens. The sealing (or seal) provides at the same time freedom of movement and clearance parallel to the recess surrounding outer surface and eliminates water leakage from the inside of the camera arm to the outside of the camera arm to keep the camera lens free of water drops. The sealing allows mounting the camera to the recess by simply pushing the camera and/or the camera lens through the scal.

The sealing may be provided by an inserted elastic element and/or over molding of a part of the camera and/or lower cover of the camera arm. If a grommet around of the camera lens is used, this grommet may be enhanced with an additional scaling lip. The additional scaling lip may have a pre-bending (without radial force on the camera lens) to the lower cover of the camera arm to provide a more robust scaling behavior.

In another embodiment the sealing is provided as a deformation capable lip. This enables an easy filling of the clearance gap and of the mounting of the camera to the recess from the inside of the camera arm. The deformable lips are finally shaped during the mounting of the camera.

In another embodiment the sealing is applied, advantageously to the recess surrounding outer surface, by a multi-material molding technology or by reversibly attaching the scaling as a separate component, preferably onto the recess surrounding outer surface. Multi-material injection molding (MMM) is the process of molding two or more different materials into one plastic part at one time creating a single-structure component (here the camera arm or a part of the camera arm) with different regional materials. In case of two different material involved, the technique is also known as 2K molding.

In another embodiment the scaling is applied or attached to the recess surrounding outer surface, or to a side face of the camera and/or the camera lens, where the side face is directing towards the recess surrounding outer surface. The clearance gap between camera/the camera lens and the recess surrounding outer surface shall be closed. This can be done by the scaling connected either to the recess surrounding outer surface or to the camera and/or the camera lens, where the sealing lips touch the opposite surface, either the camera and/or the camera lens or the recess surrounding outer surface depending on the component, where the scaling is fixed to.

In another embodiment the sealing is made of a material suitable to avoid stiching between the camera or camera lens and the recess surrounding outer surface. Also, the geometric design of the sealing might be adapted to avoid stiching. The term "stiching" denotes a sticking of the seal to the opposite side, which can hinder or even prevent the movement of the camera in the xyz-direction. Sealing on the housing and thus the clearance requirement between the housing and camera as design premises for image stability provides a WA and NA camera stiching challenge to be solved. The provided solution gives movement freedom to the camera to avoid stiching from one perspective and gives sealing solution between the housing and the camera to block the potential water drops.

The disclosure further relates to a camera arm system comprising a camera arm according to the present disclosure and a camera with an outer lens placed in a recess of the camera arm for receiving the camera, where the outer lens being part of or protruding from a camera surrounding outer surface of the camera arm.

The disclosure further relates to a vehicle comprising one or more camera arm system according to the present disclosure.

The embodiments described above can be combined with one another as desired by the person skilled in the art within the scope of the teaching according to the disclosure, also in deviation from the claim references.

BRIEF DESCRIPTION OF THE DRAWINGS

In the following, the disclosure and its embodiments are further explained with regard to the drawings.

DETAILED DESCRIPTION

Figure 1A:
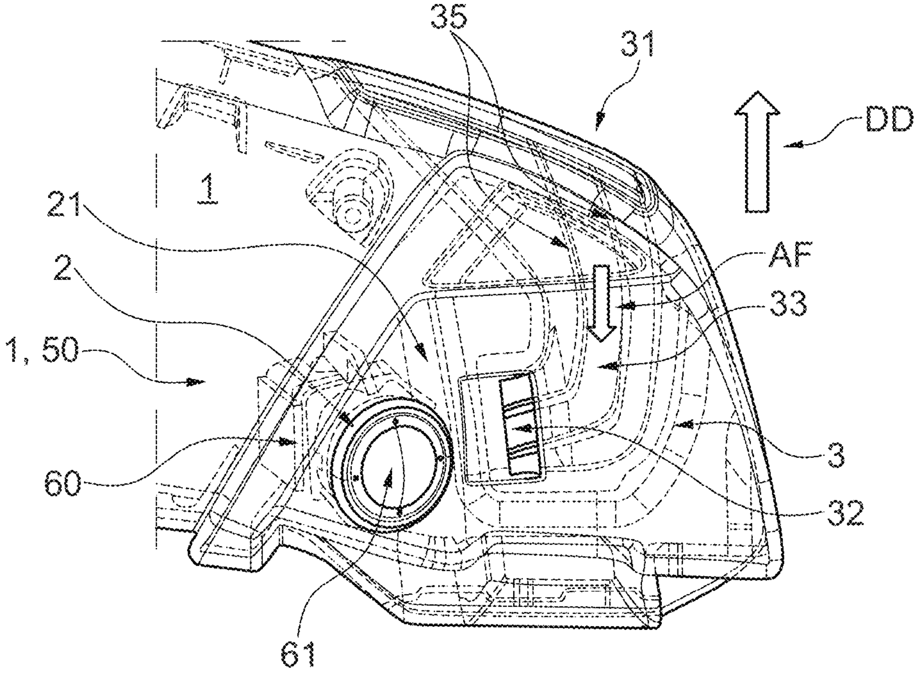
FIGS. 1(*a*) and (*b*) depict perspective views of an embodiment of the camera arm system with present camera and FIG. 1(*c*) depicts the passive camera cleaning component according to the present disclosure.
Figure 1B:
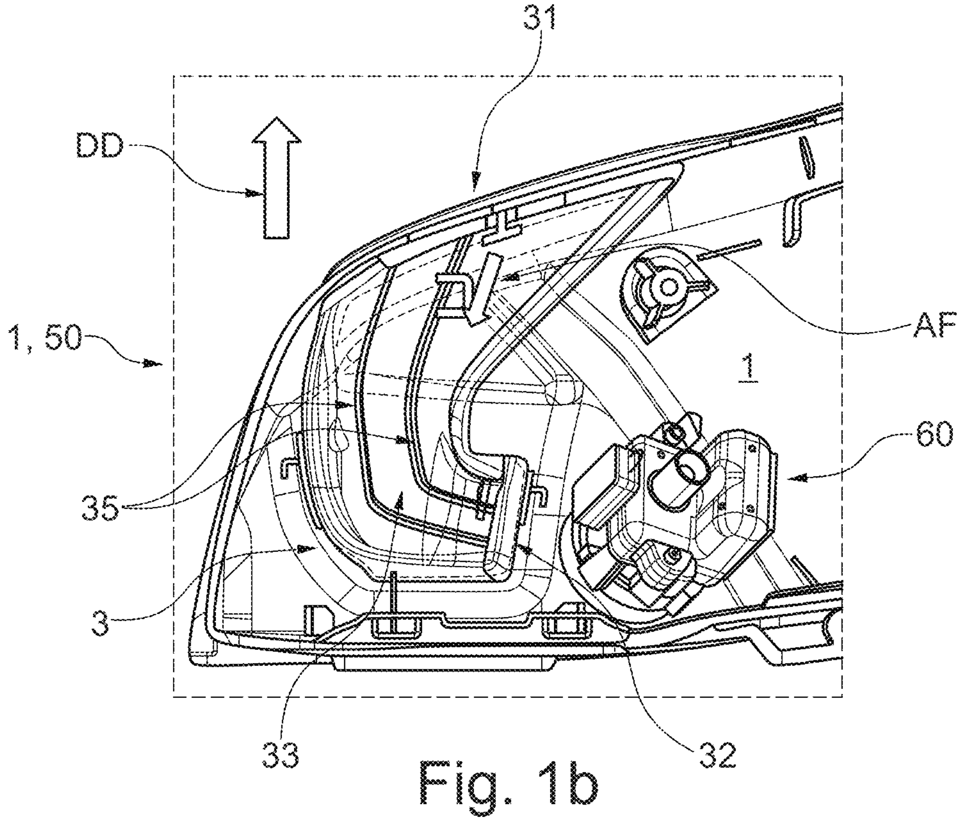
Figure 1C:
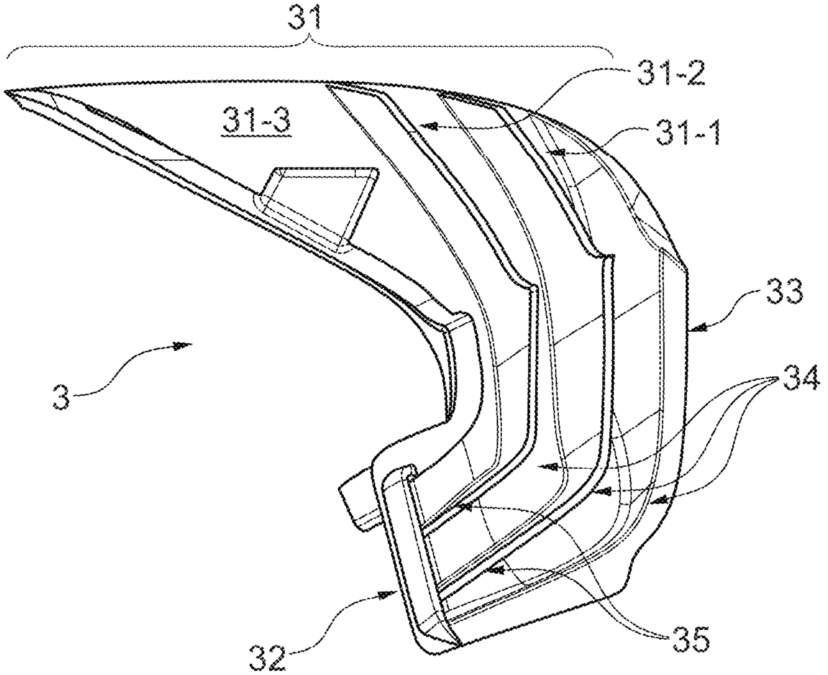

FIG. 1 shows in (a) and (b) perspective views of an embodiment of the camera arm system 50 with present camera 60 and (c) the passive camera cleaning component 3 according to the present disclosure. The camera arm system 50 will be mounted on an exterior side of a vehicle 100 (see FIG. 11). The camera arm 1 of the camera arm system 50 comprises a recess 2, where a camera 60 with an outer camera lens 61 is attached to. The lens 61 is part of the recess surrounding outer surface 21 of the camera arm 1, wherein the camera arm 1 comprises a passive camera cleaning component 3 established by an inlet opening 31 facing towards a driving direction DD of the vehicle 100 when being mounted to the vehicle 100, an outlet opening 32 adapted to laterally face the camera lens 61 of the camera 60 and an air guiding channel 33 connecting inlet opening with outlet opening to guide an air flow AF caused by an airstream AS when driving the vehicle 100. The passive camera cleaning component 3 is shown in FIG. 1(*b*) in more details. The air guiding channel 33 comprises two lamellas 35 arranged along the air flow AF inside the air guiding channel 33 dividing the air flow AF into separate sub-air flows from the inlet opening 31 to the outlet opening 32. The cross-sectional area of the air guiding channel 33 perpendicular to the air flow AF decreases from the inlet opening 31 to the outlet opening 32.

Figure 2A:
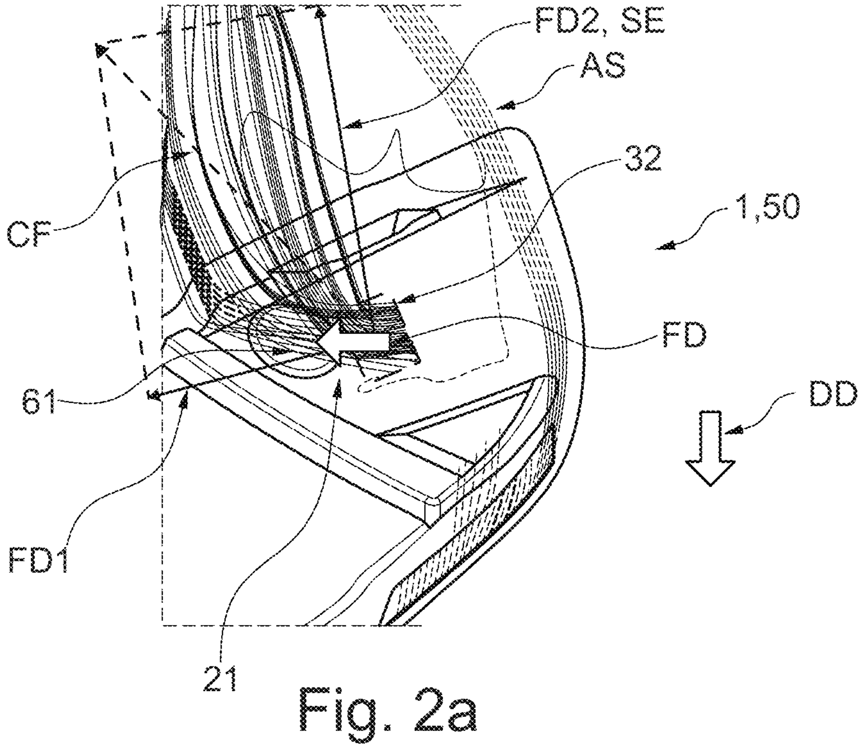
FIGS. 2(*a*)-(*c*) shown simulation results for an air flow over the camera lens and through the passive camera cleaning component in a camera arm according to the present disclosure with FIG. 2(*a*) showing a perspective view and FIGS. 2(*b*) and (*c*) showing a top view onto the camera arm with camera lens.
Figure 2B:
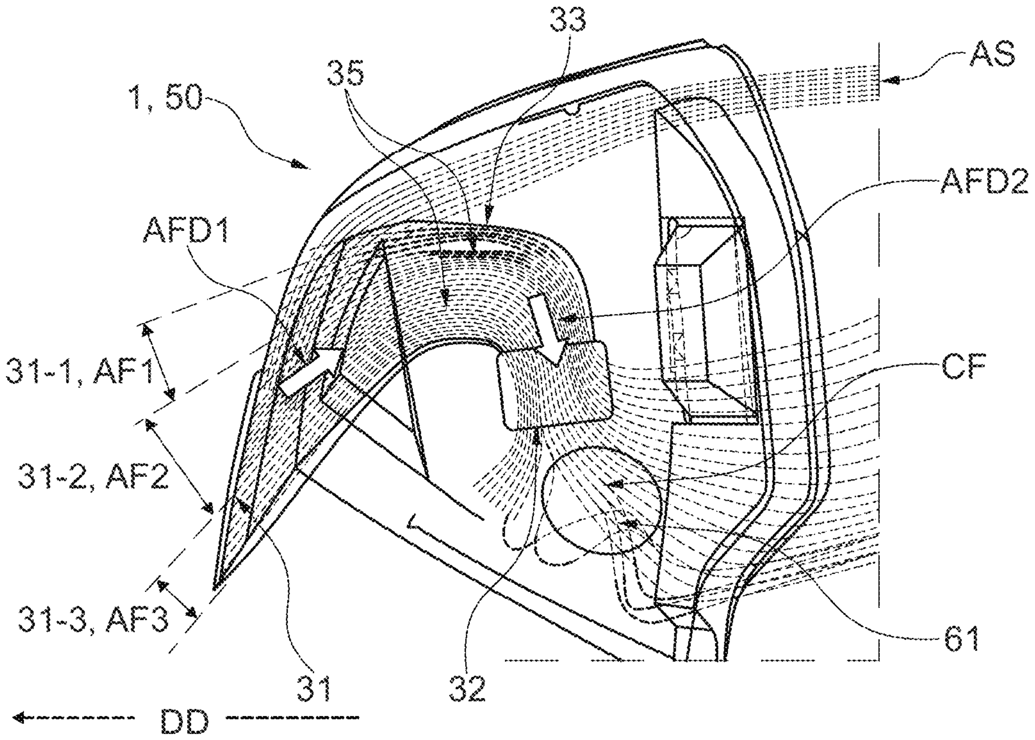
Figure 2C:
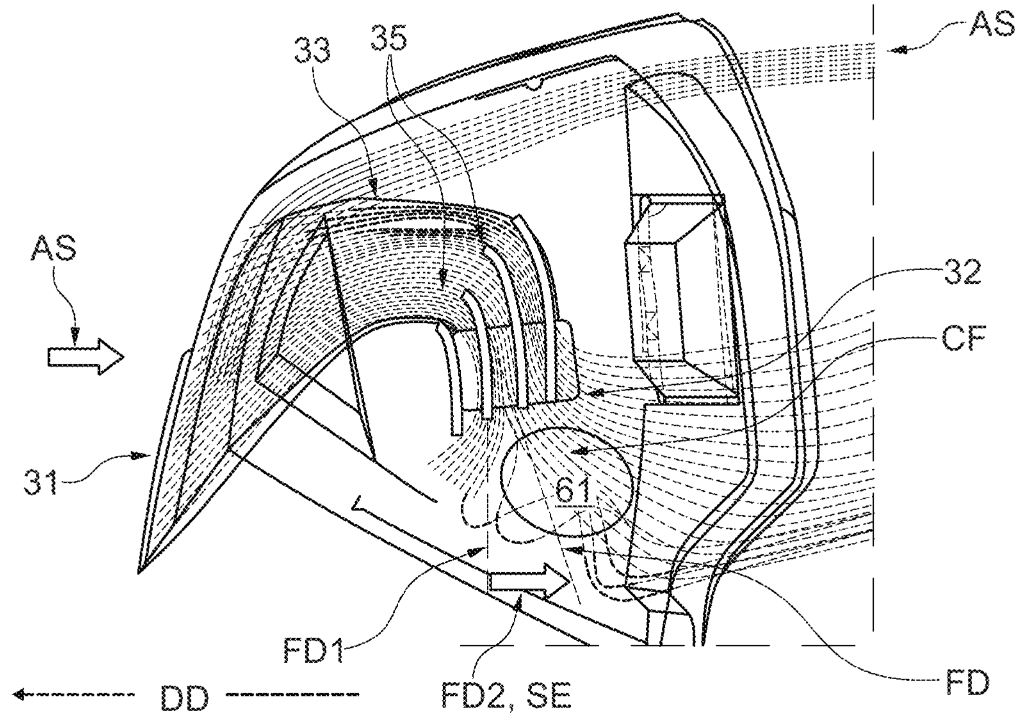

FIG. 2 shows a schematic view of simulation results for an air flow over the camera lens 61 and through the passive camera cleaning component 3 in a camera arm 1 according to the present disclosure in (a) a perspective view, and (b) and (c) in a top view onto the camera arm 1 with camera lens 61. The air flow AF and the airstream AS around the camera arm 1 are indicated with colored lines, where the color indicates the speed of the air flow. A blue color denotes a speed of 4-16 m/s, a green color denotes the speed of 16-28 m/s and a yellow color denotes a speed of 28-32 m/s. The hardware design of the camera arm 1 is shown in FIG. 1. The air flow AF entering the air guiding channel 33 via the inlet opening 31 has a first air flow direction AFD1, where the air guiding channel 33 comprises a curvature 34 of more than 90 degree redirecting the air flow AF inside the air guiding channel 33 from the first air flow direction AFD1 to a second air flow direction AFD2 with which the air flow AF exits the outlet opening 32. The outlet opening 32 is adapted to let out the air flow AF across the recess surrounding outer surface 21 in a flow direction FD whose main directional component FD1 is directed perpendicular to the driving direction DD of the vehicle 100. The camera arm 1 is suitably shaped to provide an additional suction effect SE to the air flow AF in the opposite direction of the driving direction DD when driving the vehicle 100. The resulting cleaning air flow CF is established by an interference of the air flow AF let out of the outlet opening 32 and the provided suction effect SE and directed towards the camera lens 61 of the camera 60 when the vehicle 100 is driven. The airstream AS not entering the inlet opening flows around the camera arm 1 as indicated by the lines at the top of FIGS. 2(*a*) and 2(*b*). The two lamellas 35 divide the inlet opening 31 into three separate sub-openings 31-1, 31-2, 31-3 and subsequently the air flow AF into three separate sub-air flows AF1, AF2, AF3 from the inlet opening 31 to the outlet opening 32. In this embodiment the sub-openings 31-1, 31-2, 31-3 have inlet areas indicated by the arrows increasing from the sub-opening 31-1 with the longest distance to a vehicle side of the camera arm 1 to the sub-opening 31-2 in the middle and then again decreasing again to the sub-opening 31-3 arranged in closest distance to the vehicle side of the camera arm 1. In order to shape the air flow the cross sectional area of the air guiding channel 33 perpendicular to the air flow AF decreases from the inlet opening 31 to the outlet opening 32. The air flow speed at the outlet opening 32 is higher than the air flow speed at the inlet opening, see color coding in FIGS. 2(*a*) and 2(*b*).

Figure 3A:
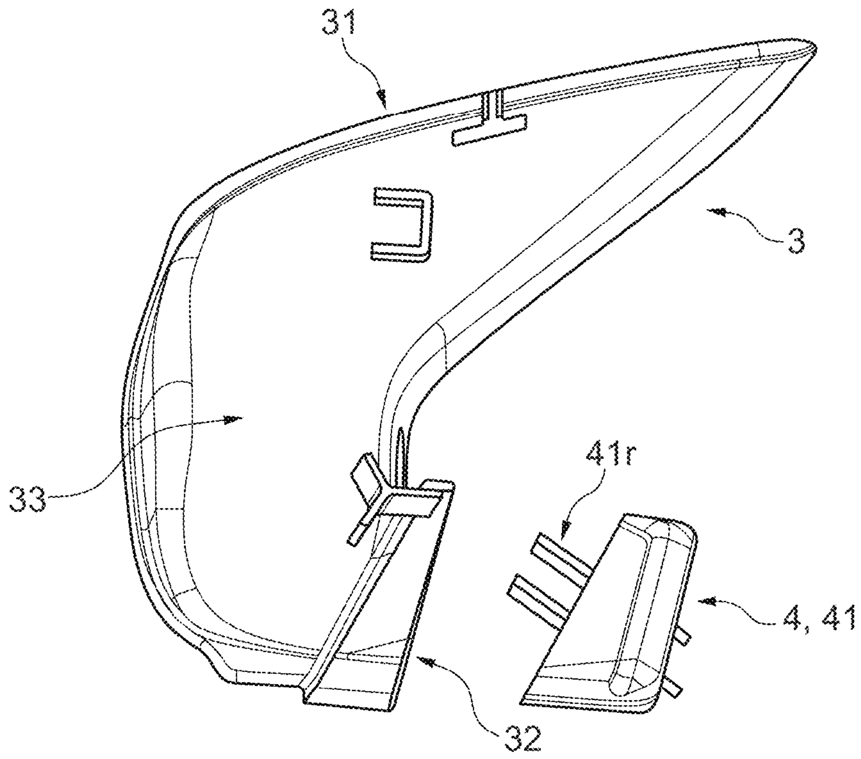
FIG. 3(*a*) shows a perspective view of embodiments of the passive camera cleaning component, and FIGS. 3(*b*) and (*c*) show perspective views of embodiments of the camera arm system according to the present disclosure all comprising a grille element as an air guiding element.
Figure 3B:
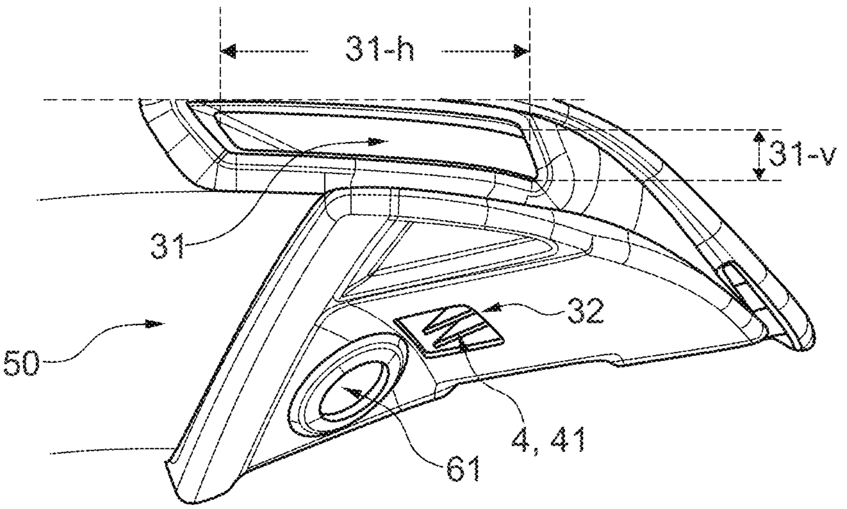
Figure 3C:
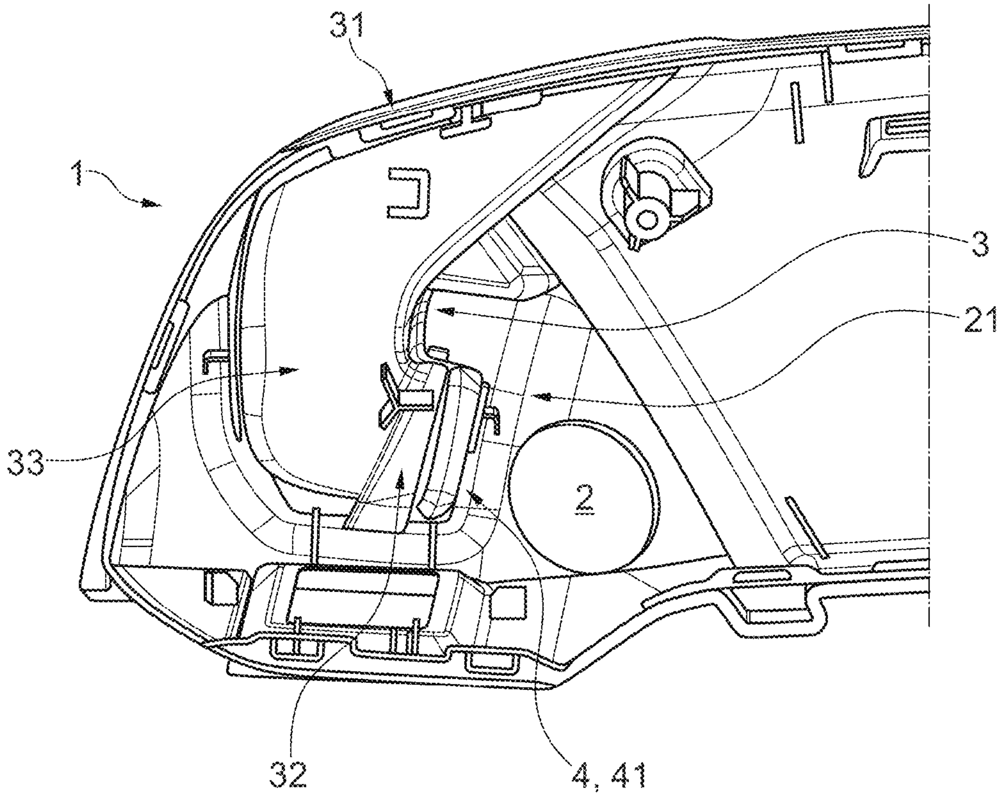

FIG. 3 shows a perspective view of embodiments of the (a) passive camera cleaning component 3 and (b) and (c) the camera arm system 50 according to the present disclosure all comprising a grille element 41 as an air guiding element 4 to further shape the air flow towards the camera lens 61. The grille element 41 comprises two rib 41*r* extending towards the recess 2, where the ribs 41*r* taper towards the recess 2. The grille element 41 is reversibly attachable to the outlet opening 32 by clipping. In other embodiments the attachment might be executed differently, e.g. by screwing. As shown in FIG. 3(*b*) the inlet opening 32 as inlet area has a rectangular shape, where a horizontal width 31-*h* of the inlet opening is larger than its the vertical width 31-*v*.

Figure 4A:
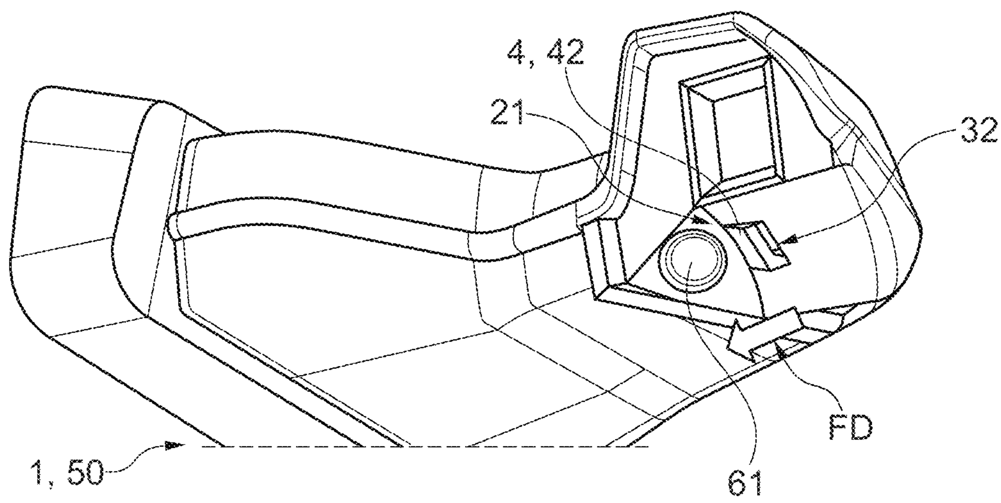
FIGS. 4(*a*) and (*b*) depict an embodiment of the camera arm system according to the present disclosure comprising an air tunnel as an air guiding element, with FIG. 4(*a*) showing a perspective view, and FIG. 4(*b*) showing a side view.
Figure 4B:
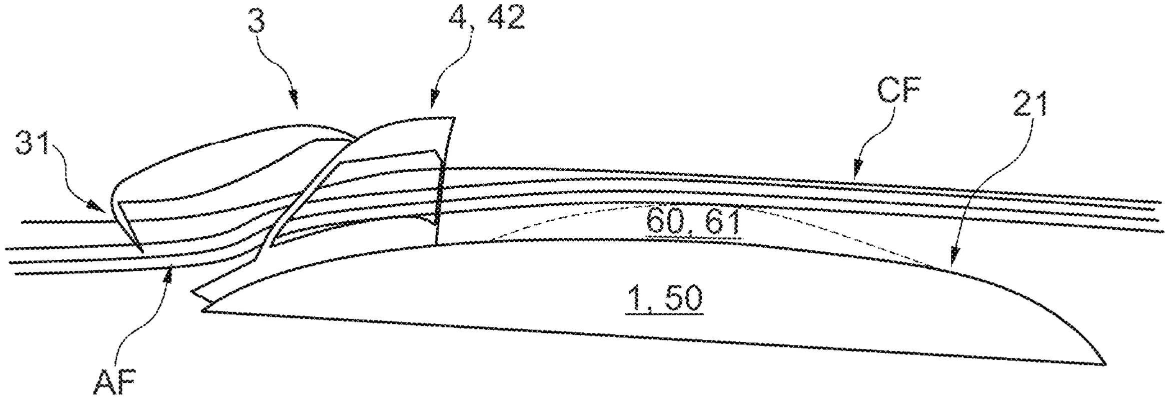

FIG. 4 shows a side view of an embodiment of the camera arm system 50 according to the present disclosure comprising an air tunnel 42 as an air guiding element 4 in (a) a perspective view, and (b) a side view. The air tunnel 42 is suitable shaped to guide the air flow AF to the camera lens 61, where the air flow AF is lifted from the recess surrounding outer surface 21. The air tunnel 42 is reversibly attachable to the outlet opening 32 by clipping. In other embodiments the attachment might be executed differently, e.g. by screwing.

Figure 5:
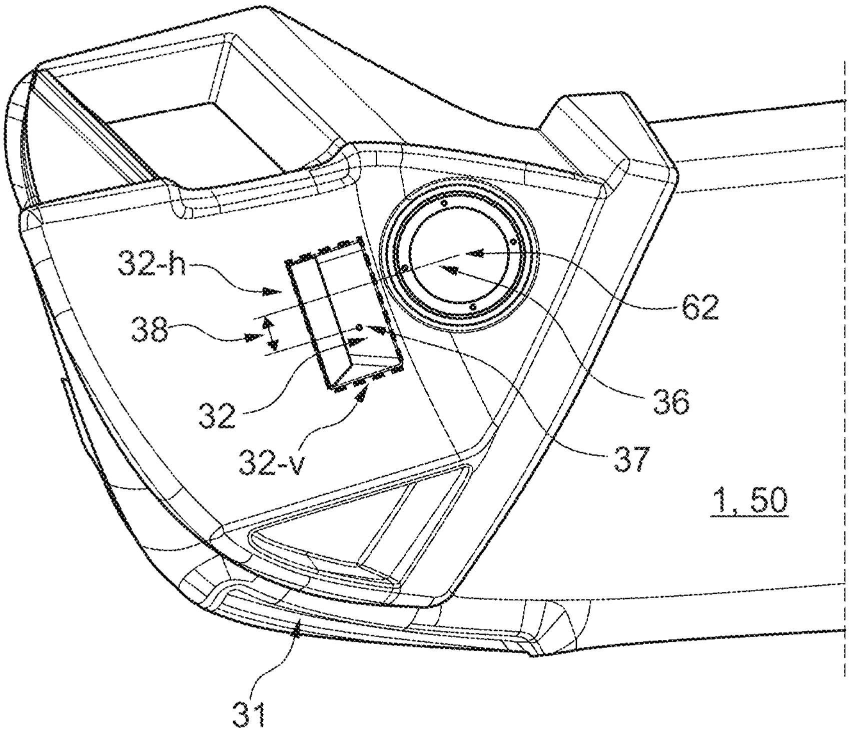
FIG. 5 shows a perspective view of an embodiment of the camera arm system according to the present disclosure with outlet opening.

FIG. 5 shows a perspective view of an embodiment of the camera arm system 50 according to the present disclosure with outlet opening. Here, the outlet opening 32 has an outlet area with a rectangular shape, where a horizontal width 32-*h* of the outlet opening 32 is larger than a vertical width 32-*v* of the opening area 32. An imaginary reference line 36 extends in perpendicular direction from the horizontal width 32-*h* of the outlet opening area 32 to the center 62 of the camera lens 61. A geometrical center 37 of the rectangular shape of the outlet opening 32 is shifted along the horizontal width 32-*h* of the rectangular shape of the outlet opening 32 in driving direction DD by a distance 38 starting from the imaginary reference line 36 to the geometrical center 37 being equal or larger than ¼ of the horizontal width 32-*h*. The term “imaginary” denotes, that the reference line 36 is not a hardware line in reality, but only thought when adjusting the location of the outlet opening 32.

Figure 6:
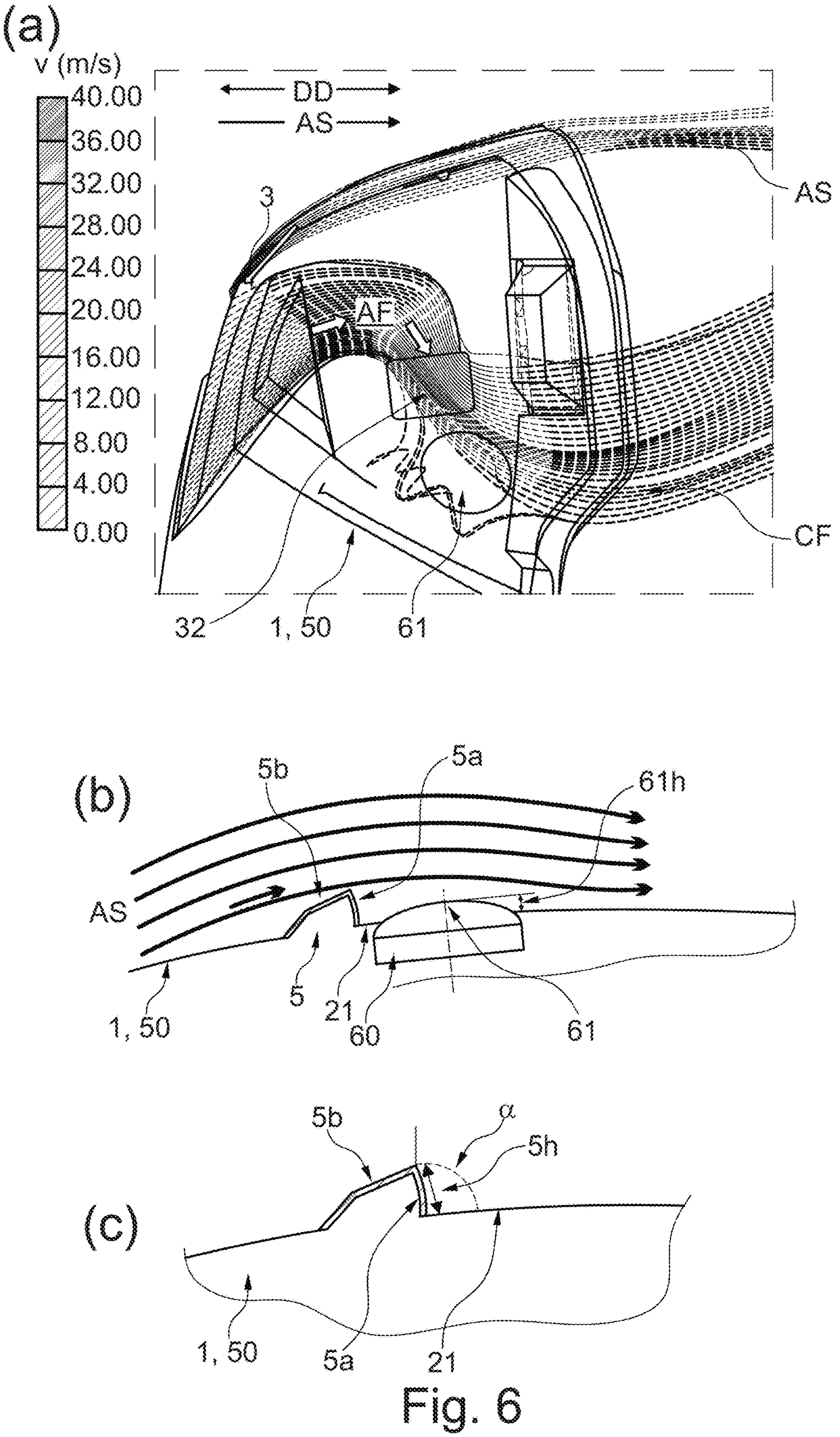
FIG. 6(*a*) shows a top view to a camera arm according to the present disclosure comprising a wing guide near the camera lens, and FIGS. 6(*b*) and (*c*) depict schematic side views of the camera arm shown in FIG. 6(*a*).
Figure 7:
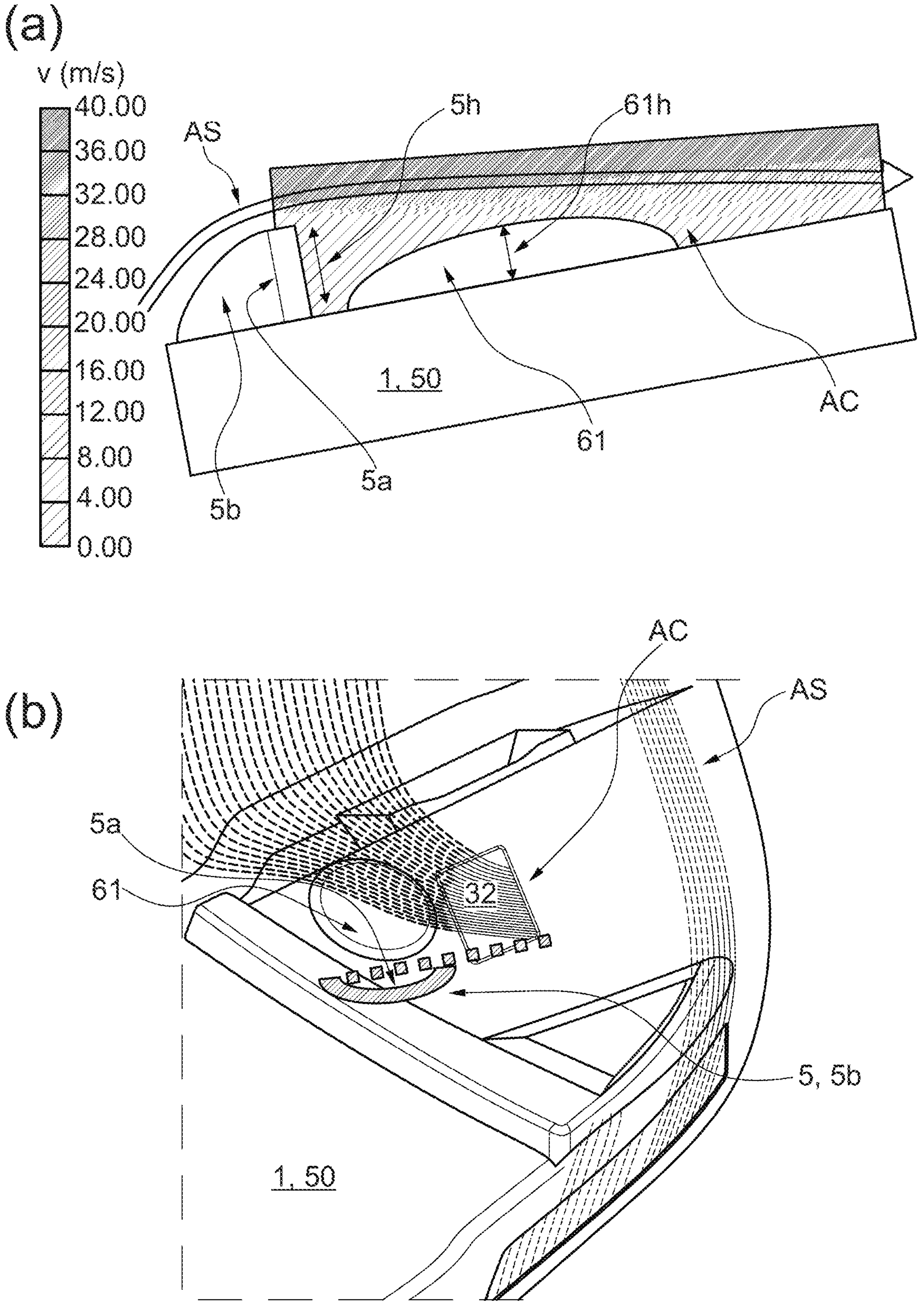
FIG. 7(*a*) depicts a schematic side view of the camera arm of FIG. 6 with indicated airstream velocities, and FIG. 7(*b*) depicts a perspective view on this camera arm with camera lens and outlet opening.
Figure 8:
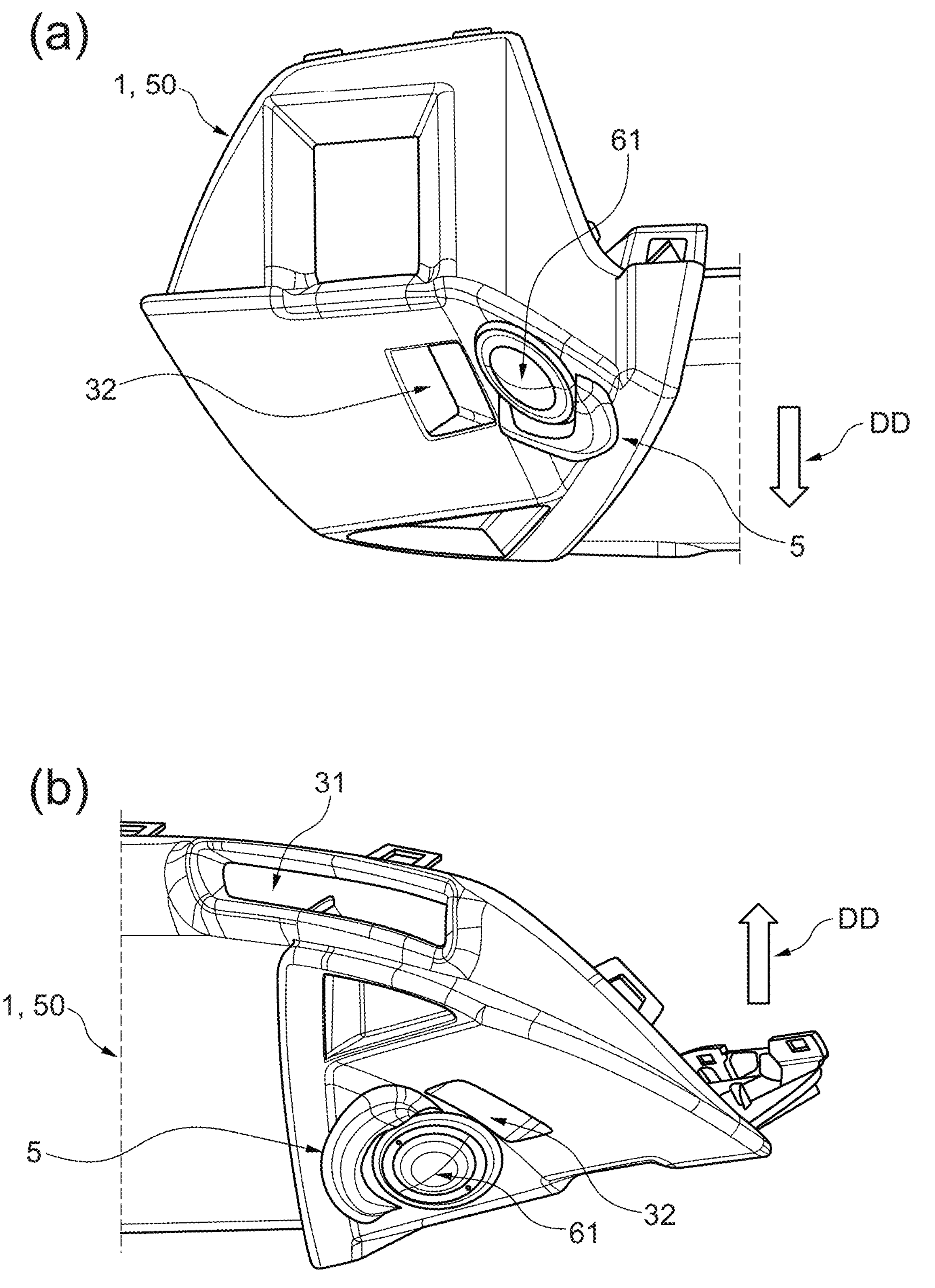
FIGS. 8(*a*) and (*b*) depict two perspective views of the camera arm system according to the present disclosure comprising a wing guide partly surrounding the camera lens.

FIG. 6 shows a (a) top view to a camera arm according to the present disclosure comprising a wing guide near the camera lens, and (b) and (c) schematic side views of the camera arm shown in FIG. 6(*a*). FIG. 7 shows a (a) schematic side view of the camera arm of FIG. 6 with indicated airstream velocities, and a perspective view on this camera arm with camera lens and outlet opening. FIG. 8 shows two perspective views (a) and (b) of the camera arm system according to the present disclosure comprising a wing guide partly surrounding the camera lens. The wing guide 5 is arranged close to the recess surrounding outer surface 21 and being suitably shaped to block the recess surrounding outer surface 21 from direct contact with the airstream AS around the camera arm 1 caused by driving the vehicle 100. The wing guide 5 is suitably shaped to provide an air cushion AC around the outlet opening 32 and the camera lens 61 lifting off the airstream AS from the recess surrounding outer surface 21. The wing guide 5 has a first surface 5*a* directing towards the recess 2 and a second surface 5*b* directing in an opposite direction, where the wing guide 5 has a sawtooth shape with the second surface 5*b* as a slowly rising surface and the first surface 5*a* as a steeply sloping surface of the sawtooth shape. The first surface 5*a* protrudes from the recess surrounding surface 21 with a height 5*h* that is at least of twice as large as the height 61*h* of the camera lens 61 with which the camera lens 61 protrudes from the recess surrounding surface 21. The first surface 5*a* protrudes in vertical direction from the recess surrounding surface 21. In FIGS. 6 and 7 the airstream velocity is indicated by color codes transferring colors to velocities. As shown in FIGS. 8(*a*) and 8(*b*) the wing guide 5 may partly surrounds the recess 2 and/or the camera lens 21. The shape of the wing guide 5 might be adjusted to the most probable travel speed value of the vehicle 100 during driving the vehicle 100.

Figure 9:
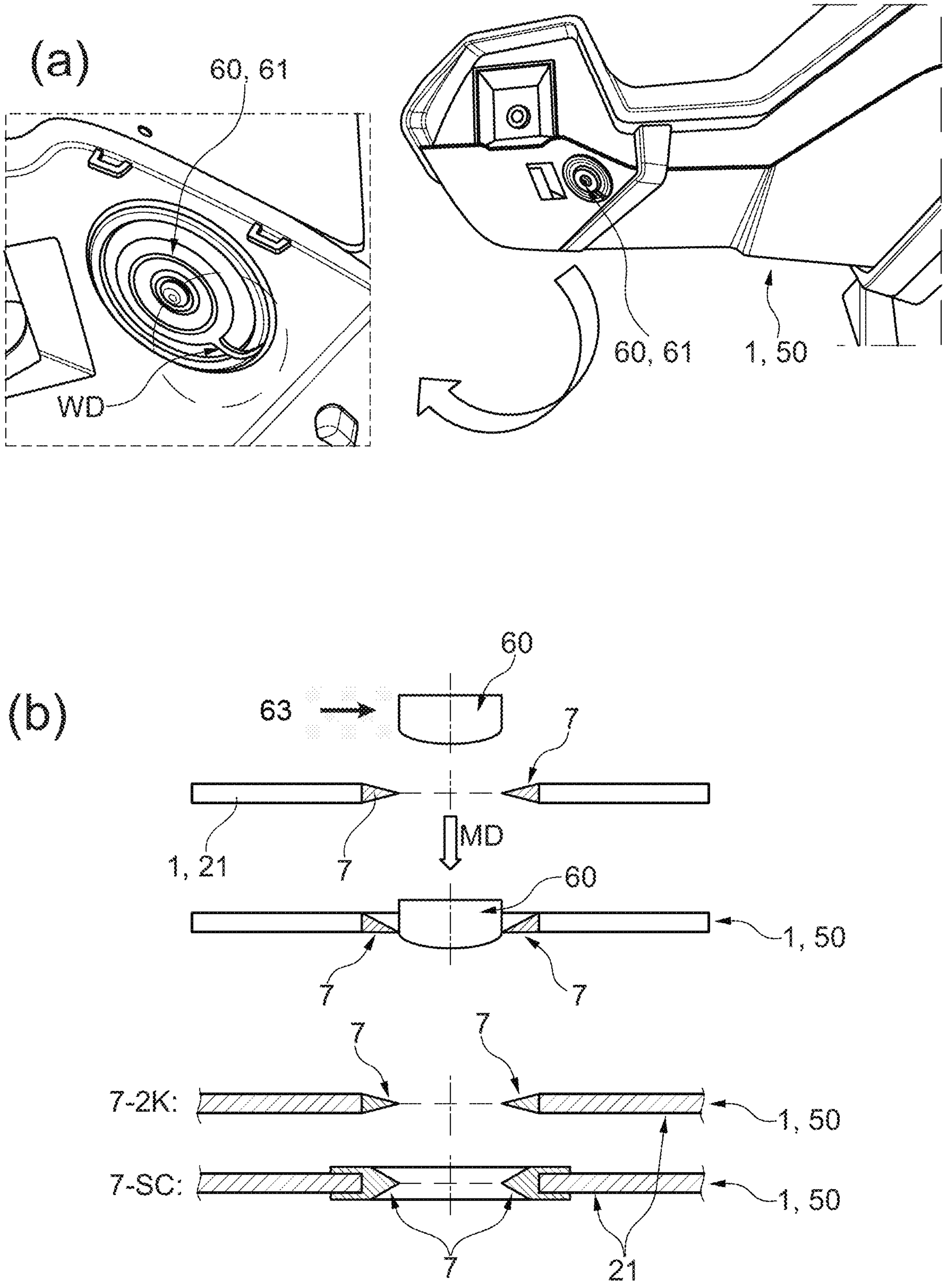
FIG. 9(*a*) depicts the camera arm system according to the present disclosure without a scaling, and FIG. 9(*b*) the camera arm system according to the present disclosure with a sealing covering the clearance gap between camera and the recess surrounding outer surface.

FIG. 9 shows the camera arm system 50 according to the present disclosure (a) without a sealing 7, and (b) with a sealing 7 covering a clearance gap between camera 60 and the recess surrounding outer surface 21. In FIG. 9(*a*) the complete camera arm 1 with camera 60 is shown, where a section of this figure shows the recess surrounding outer surface 21, where a water drop WD is present on the outer area of the camera lens 61 highlighted with a white circle. In FIG. 9(*b*), the sealing 7 is present on the edge of the recess surrounding outer surface facing towards the recess and is therefore arranged between the camera 60 and the recess surrounding outer surface 21 of the camera arm 1. When the camera 60 is mounted to the recess 2 along the camera mounting direction MD, the sealing 7 covers the clearance gap (not shown here in details) between the camera 60 and the recess surrounding outer surface 21. The sealing 7 is provided as a deformation capable lip, which is slightly curved outwards by the pressure of the camera 60 applied during mounting, so that the camera 60 can be pushed through the scaling 7 and the sealing 7 still fits tightly against the camera body to firmly close the clearance gap. As shown in the lower part of FIG. 9(*b*) the scaling 7 might be applied to the recess surrounding outer surface 21 by a multi-material molding technology 7-2K, here a 2K-molding. In an alternative arrangement (not shown here) the scaling 7 might be applied or attached to a side face 63 of the camera 60 and/or the camera lens 61, where the side face is directing towards the recess surrounding outer surface 21. In both cases, the sealing 7 might be reversibly attached onto the recess surrounding outer surface 21 or onto the side face 63 of the camera 60 or the camera lens 61 as a separate component 7-SC. Preferably, the sealing 7 is made of a material suitable to avoid stiching between the camera 60 or camera lens 61 and the recess surrounding outer surface 21. Also, the geometric design of the sealing 7 might be adapted to avoid stiching. Still further, having an appropriate sealing 7 movement freedom is provided to the camera 60 to avoid stitching from one perspective in addition to the sealing function blocking water drops.

Figure 10:
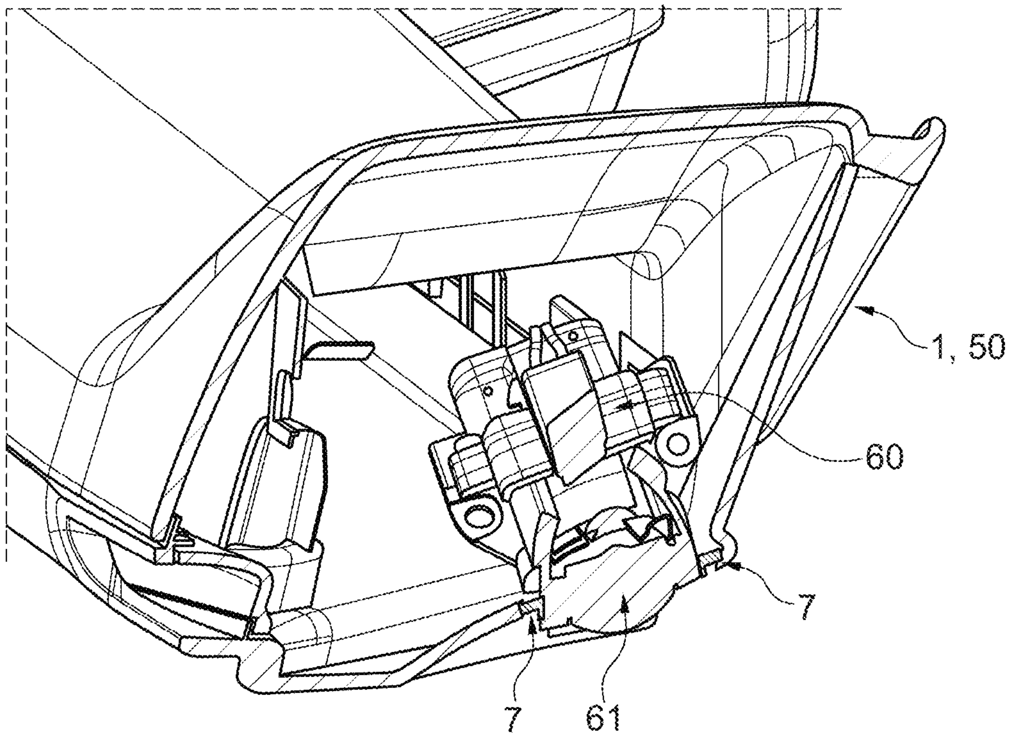
FIGS. 10(*a*) and (*b*) depict the camera arm system according to the present disclosure with a sealing covering the clearance gap between camera and the recess surrounding outer surface, with FIG. 10(*a*) showing a perspective view and FIG. 10(*b*) showing a side view.
Figure 10:
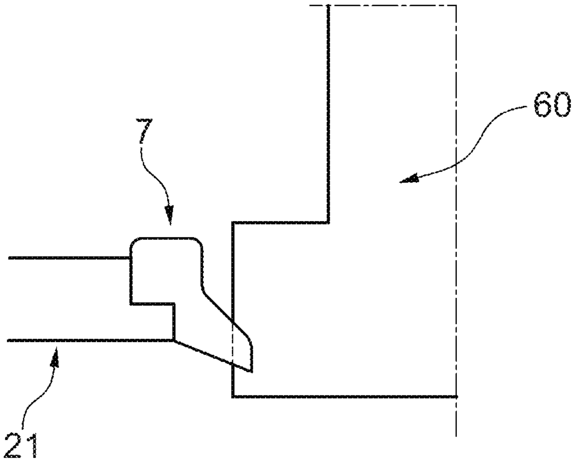

FIG. 10 also shows the camera arm system 50 according to the present disclosure with a sealing 7 covering the clearance gap between camera 60 and the recess surrounding outer surface 21 in (a) perspective view and (b) side view. For details we refer to FIG. 9(*b*).

Figure 11:
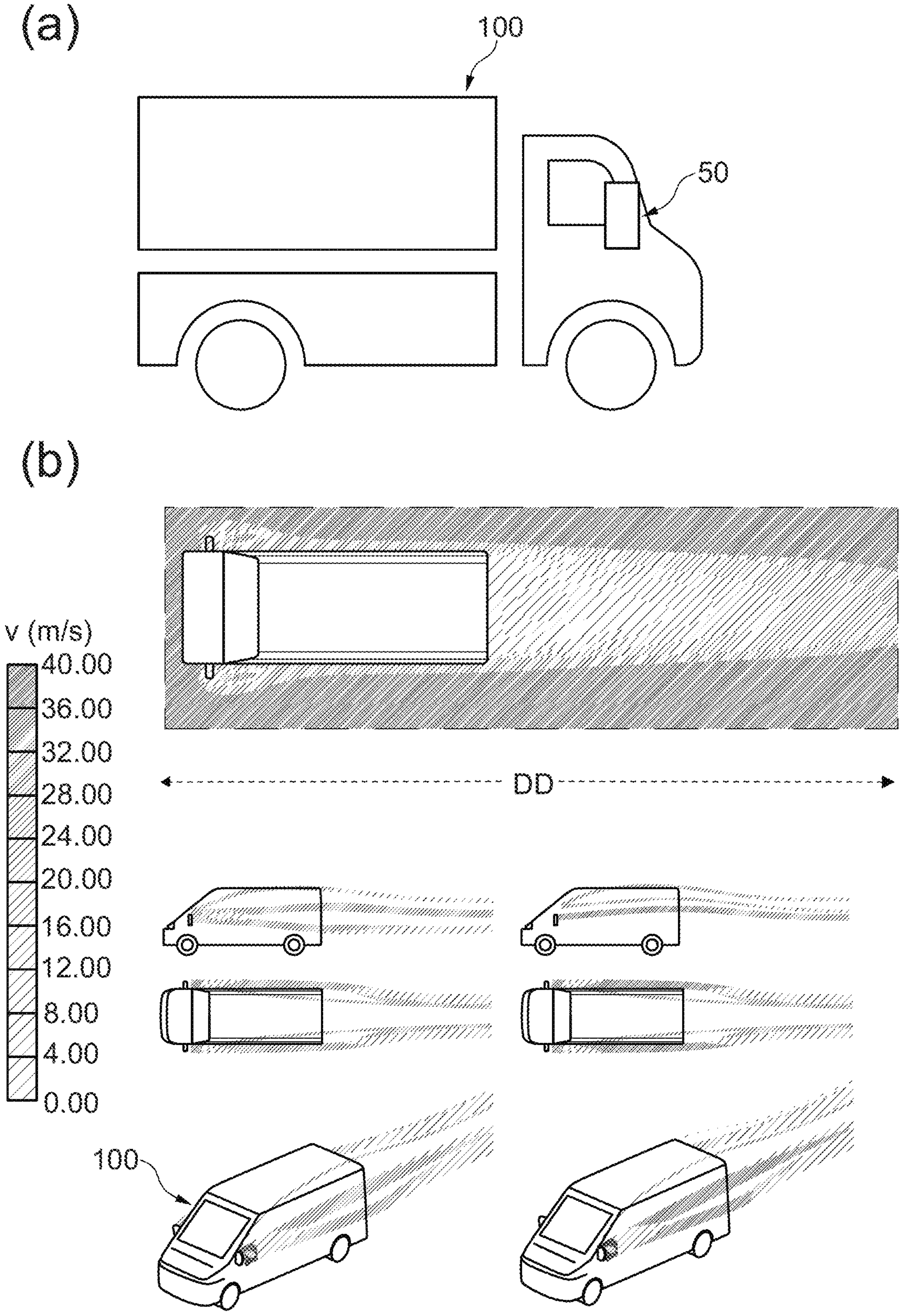
FIG. 11(*a*) depicts a schematic view of a vehicle according to the present disclosure comprising a camera arm system according to the present disclosure, and FIG. 11(*b*) shows such vehicle with wing guides where airstream speeds are indicated by colors.

FIG. 11 shows a (a) schematic view of a vehicle 100 according to the present disclosure comprising a camera arm system 50 according to the present disclosure comprising a camera arm 1 and a camera 60 with an outer lens 61 placed in a recess 2 of the camera arm 1 for receiving the camera 60, where the outer lens 61 being part of or protruding from a camera surrounding outer surface 21 of the camera arm 1, and (b) such vehicle 100 with wing guides 5, where airstream speeds are indicated by shading (see shade code transferring shades to velocities). Certain features of the vehicle as implemented in the air flow generate a low pressure region indicated by the lighter shades reflecting 4.00 to 16.00 m/s. This is known as a drag or suction effect for example behind the truck as well as behind rearview mirrors or camera arms. Implementing such feature, e.g. wing guides, in the near vicinity of the camera lens which in certain "more used" speed condition of the vehicle generates a guided low pressure region on the camera lens. The high velocity airstream (darker shade reflecting 36.00 to 40.00 m/s) is guided away from the region causing a low pressure on the camera lens surface. With this the dust and impurities are not allowed to remain on the camera lens surfaces and are extracted by the air flow from the surface in a similar matter.

REFERENCE SIGNS

1 camera arm according to the present disclosure
2 recess
21 recess surrounding outer surface
3 passive camera cleaning component
31 inlet opening facing towards a driving direction of the vehicle
31-1 . . . 31-3 sub openings of the inlet opening
31-*h* horizontal width of the inlet opening
31-*v* vertical width of the inlet opening
32 outlet opening adapted to face the camera lens of the camera
32-*h* horizontal width of the outlet opening
32-*v* vertical width of the outlet opening
33 air guiding channel connecting inlet opening with outlet opening
34 curvature of the air guiding channel
35 lamella inside the air guiding channel
36 reference line
37 geometrical center of the outlet opening area
38 distance from the reference line to the geometrical center
4 air guiding element
41 grille element
41*r* rip(s) of the grille element
42 air tunnel
5 wing guide
5*a* first surface of the wing guide directing towards the recess
5*b* second surface of the wing guide directing towards the intended driving direction
5*h* height of the surface 5*a*
7 sealing
7-2K sealing applied by 2K technology
7-SC sealing mounted as separate component
50 camera arm system
60 camera
61 outer lens of the camera
61*h* height of the camera lens with respect to the recess surrounding outer surface
62 center of the camera lens
63 side face of the camera and/or the camera lens
100 vehicle
AC air cushion
AF air flow
AF1 . . . AF3 sub-air flows
AFD1 first air flow direction
AFD2 second air flow direction
AS airstream caused by driving the vehicle
CF cleaning air flow
DD driving direction
FD flow direction of the air flow let out of the outlet opening
FD1 main direction component
FD2 secondary direction component
MD camera mounting direction
SE suction effect
WD water drop

The invention claimed is:

1. A camera arm for an exterior camera arm system configured to be mounted on an exterior side of a vehicle, comprising:

a recess provided for receiving a camera with an outer camera lens being part of or protruding from a recess-surrounding outer surface of the camera arm;

a passive camera cleaning component comprising an inlet opening facing towards a driving direction of the vehicle when mounted to the vehicle, an outlet opening adapted to face the camera lens of the camera when received in the recess, and an air guiding channel connecting the inlet opening with the outlet opening to guide an air flow caused by an airstream when driving the vehicle, the outlet opening being configured to let out the air flow across the recess-surrounding outer surface in a flow direction (FD) with a main directional component being directed substantially perpendicular to the driving direction of the vehicle, wherein the camera arm is shaped to provide a suction effect to the air flow in an opposite direction of the driving direction when driving the vehicle, wherein a cleaning air flow resulting from an interference of the air flow let out of the outlet opening and the provided suction effect is directed towards the camera lens of the camera being received in the recess when the vehicle is driven, wherein the air guiding channel comprises one or more lamellas arranged along the air flow inside the air guiding channel dividing the air flow into two or more sub-air flows, wherein the one or more lamellas divide the inlet opening into separate sub-openings, and wherein the sub-openings have inlet areas increasing from the sub-opening with the longest distance to a vehicle side of the camera arm to the sub-opening arranged in closest distance to the vehicle side of the camera arm.

2. The camera arm according to claim 1, wherein the air flow entering the air guiding channel via the inlet opening has a first air flow direction, and wherein the air guiding channel comprises a curvature of 45 degrees or more redirecting the air flow inside the air guiding channel from the first air flow direction to a second air flow direction with which the air flow exits the outlet opening.

3. The camera arm according to claim 1, wherein a cross sectional area of the air guiding channel perpendicular to the air flow decreases from the inlet opening to the outlet opening.

4. The camera arm according to claim 1, wherein the inlet opening has a substantially round, elliptical, semicircle, triangular, polygonal, diamond, rhomboid, cross, ring, arched, and/or rectangular shape, wherein a horizontal width of the inlet opening is larger than its vertical width.

5. The camera arm according to claim 1, wherein the outlet opening is covered by an air guiding element to further shape the air flow towards the camera lens.

6. The camera arm according to claim 5, wherein the air guiding element is a grille element comprising one or more ribs extending towards the recess.

7. The camera arm according to claim 6, wherein at least one of the one or more ribs taper towards the recess.

8. The camera arm according to claim 5, wherein the air guiding element is an air tunnel shaped to guide the air flow to the camera lens, where the air flow is lifted from the recess surrounding outer surface.

9. The camera arm according to one of claim 5, wherein the air guiding element is reversibly attachable to the outlet opening.

10. The camera arm according to claim 9, wherein the air guiding element is attachable to the outlet opening by clipping and/or screwing.

11. The camera arm according to claim 1, wherein the outlet opening has a substantially round, elliptical, semicircle, triangular, polygonal, diamond, rhomboid, cross, ring, arched, and/or rectangular shape, where a horizontal width of the outlet opening is larger than a vertical width of the substantially round, elliptical, semicircle, triangular, polygonal, diamond, rhomboid, cross, ring, arched, and/or rectangular shape.

12. A camera arm for an exterior camera arm system configured to be mounted on an exterior side of a vehicle, comprising:

a recess provided for receiving a camera with an outer camera lens being part of or protruding from a recess-surrounding outer surface of the camera arm;

a passive camera cleaning component comprising an inlet opening facing towards a driving direction of the vehicle when mounted to the vehicle, an outlet opening adapted to face the camera lens of the camera when received in the recess, and an air guiding channel connecting the inlet opening with the outlet opening to guide an air flow caused by an airstream when driving the vehicle, the outlet opening being configured to let out the air flow across the recess-surrounding outer surface in a flow direction (FD) with a main directional component being directed substantially perpendicular to the driving direction of the vehicle, wherein the camera arm is shaped to provide a suction effect to the air flow in an opposite direction of the driving direction when driving the vehicle, wherein a cleaning air flow resulting from an interference of the air flow let out of the outlet opening and the provided suction effect is directed towards the camera lens of the camera being received in the recess when the vehicle is driven, wherein the outlet opening has a substantially round, elliptical, semicircle, triangular, polygonal, diamond, rhomboid, cross, ring, arched, and/or rectangular shape, where a horizontal width of the outlet opening is larger than a vertical width of the substantially round, elliptical, semicircle, triangular, polygonal, diamond, rhomboid, cross, ring, arched, and/or rectangular shape, and wherein an imaginary reference line extends in perpendicular direction from the horizontal width of the outlet opening to the center of the camera lens, where a geometrical center of the substantially round, elliptical, semicircle, triangular, polygonal, diamond, rhomboid, cross, ring, arched, and/or rectangular shape of the outlet opening is shifted along the horizontal width of the substantially round, elliptical, semicircle, triangular, polygonal, diamond, rhomboid, cross, ring, arched, and/or rectangular shape of the outlet opening in driving direction by a distance starting from the imaginary reference line to the geometrical center being equal or larger than ¼ of the horizontal width.

13. A camera arm for an exterior camera arm system configured to be mounted on an exterior side of a vehicle, comprising:

a recess provided for receiving a camera with an outer camera lens being part of or protruding from a recess-surrounding outer surface of the camera arm;

a passive camera cleaning component comprising an inlet opening facing towards a driving direction of the vehicle when mounted to the vehicle, an outlet opening adapted to face the camera lens of the camera when received in the recess, and an air guiding channel connecting the inlet opening with the outlet opening to guide an air flow caused by an airstream when driving the vehicle, the outlet opening being configured to let out the air flow across the recess-surrounding outer surface in a flow direction (FD) with a main directional component being directed substantially perpendicular to the driving direction of the vehicle, wherein the camera arm is shaped to provide a suction effect to the air flow in an opposite direction of the driving direction when driving the vehicle, wherein a cleaning air flow resulting from an interference of the air flow let out of the outlet opening and the provided suction effect is directed towards the camera lens of the camera being received in the recess when the vehicle is driven, wherein a wing guide is arranged close to the recess surrounding outer surface, and wherein the wind guide is shaped to block at least partly the recess surrounding outer surface from direct contact with the airstream around at least a part of the camera arm caused by driving the vehicle, and/or wherein the wing guide is substantially in the form of a wall adapted to change the direction of the air stream and reduce the pressure onto the camera lens.

14. The camera arm according to claim 13, wherein the wing guide is shaped to provide an air cushion around the outlet opening and the camera lens lifting off the airstream from the recess surrounding outer surface.

15. The camera arm according to claim 13, wherein the wing guide has a first surface directing towards the recess and a second surface directing in an opposite direction, where the wing guide has a sawtooth shape with the second surface as a slowly rising surface and the first surface as a steeply sloping surface of the sawtooth shape.

16. The camera arm according to claim 15, wherein the first surface protrudes from the recess surrounding surface with a height that is at least twice as large as the height of the camera lens with which the camera lens protrudes from the recess surrounding surface.

17. The camera arm according to claim 15, wherein the first surface protrudes in vertical direction from the recess surrounding surface.

18. The camera arm according to one of claim 13, wherein the wing guide partly surrounds the recess and/or the camera lens.

19. The camera arm according to claim 1, wherein a sealing is arranged between the camera and/or camera lens and the recess surrounding outer surface of the camera arm, the sealing covering a clearance gap between the camera and/or camera lens and the recess surrounding outer surface.

20. The camera arm according to claim 19, wherein the sealing is provided as a deformation capable lip.

21. The camera arm according to claim 19, wherein the sealing is applied to the recess surrounding outer surface by a multi-material molding technology or by reversibly attaching the sealing as a separate component onto the recess surrounding outer surface.

22. A camera arm system comprising a camera arm according to claim 1 and a camera with an outer lens placed in a recess of the camera arm for receiving the camera, where the outer lens being part of or protruding from a camera surrounding outer surface of the camera arm.

23. A vehicle comprising one or more camera arm systems according to claim 22.

* * * * *